United States Patent [19]

Obermanns et al.

[11] Patent Number: 5,544,152
[45] Date of Patent: Aug. 6, 1996

[54] METHOD FOR SETTING UP VIRTUAL CONNECTIONS IN PACKET SWITCHING NETWORKS

[75] Inventors: Sebastian Obermanns, Munich; Richard Schoonhoven, Olching, both of Germany

[73] Assignee: Siemens Aktiengesellschaft, Munich, Germany

[21] Appl. No.: 535,571

[22] Filed: Sep. 28, 1995

Related U.S. Application Data

[63] Continuation of Ser. No. 265,445, Jun. 24, 1994, abandoned.

[30] Foreign Application Priority Data

Jun. 25, 1993 [EP] European Pat. Off. .............. 93110217

[51] Int. Cl.⁶ .................................................. H04L 12/56
[52] U.S. Cl. ................ 370/16; 370/54; 370/60; 370/94.1; 379/221; 340/825.01; 340/827
[58] Field of Search .................... 370/16, 14, 60, 370/60.1, 42, 54, 79, 110.1, 13, 58.1, 94.1, 94.2; 379/219, 220, 221; 340/825.01, 825.03, 827, 825.06, 825.07

[56] References Cited

U.S. PATENT DOCUMENTS

| | | | |
|---|---|---|---|
| 4,348,554 | 9/1982 | Asmuth | 379/113 |
| 4,802,199 | 1/1989 | Lange et al. | 379/221 |
| 4,884,263 | 11/1989 | Suzuki | 370/16 |
| 5,210,740 | 5/1993 | Anzai et al. | 370/16 |
| 5,307,344 | 4/1994 | Mueller et al. | 370/60 |
| 5,311,502 | 5/1994 | Mueller et al. | 370/60 |

FOREIGN PATENT DOCUMENTS

4128938A1  4/1993  Germany.

OTHER PUBLICATIONS

Article presented at IEEE GLOBECOM Telecommunications Conference & Exhibition, Nov. 27, 1989, Dallas, Texas, entitled "Integrated ISDN D-Server For Intelligent Networking", by L. H. Eberl, and P. Chen.

Japanese Patent Abstract No. JP4291595 with a publication date of Oct. 15, 1992 entitled "Virtual Private Network Connecting System".

*Primary Examiner*—Alpus H. Hsu
*Assistant Examiner*—Ricky Ngo
*Attorney, Agent, or Firm*—Hill, Steadman & Simpson

[57] ABSTRACT

A method for setting up virtual connections in packet switching networks is disclosed wherein a virtual connection within a second packet switching network is used to maintain or create a virtual connection between subscriber equipment in a first packet switching network. The first packet switching network employs the signaling protocol of the second packet switching network when initiating the second virtual connection so that it is not necessary for the second packet switching network to recognize a specific signaling protocol.

16 Claims, 1 Drawing Sheet

METHOD FOR SETTING UP VIRTUAL CONNECTIONS IN PACKET SWITCHING NETWORKS

This is a continuation of application Ser. No. 08/265,445, filed Jun. 24, 1994, now abandoned.

BACKGROUND OF THE INVENTION

1. Field of the Invention

The present invention relates to a method of connecting packet switching networks and, more particularly, this invention relates to a method of setting up virtual connections in packet switching networks.

2. Description of the Prior Art

Various methods of connecting packet switching networks are known in the art, one such method is disclosed in German Published Application DE 41 28 938. In this method, when a pending call packet does not have a connecting path for call setup within a first packet switching network, the call packet is transmitted to a first network interface location in modified form via a second packet switching network. In addition to an address field, an address expansion field is provided in this modified call packet. The address expansion field contains address information identifying a second network interface location and an information flag indicating that the address field and address expansion field have been exchanged. The address information contained in the address field and in the address expansion field of the modified call packet are exchanged with one another at the first network interface location. A connecting path is subsequently defined within the second packet switching network to the second network interface location and the modified call packet is forwarded to that location. This connecting path is defined based on the address information now contained in the address field of the modified call packet which identifies the second network interface location. The address information contained in the address field and the address expansion field are again exchanged at the second network interface location based on the flag set in the modified call packet. A virtual connection is then set up in the first packet switching network to the called subscriber equipment based on the address information that is now contained in the address field of the modified call packet. This information identifies the called subscriber equipment.

This known method requires that the second packet switching network be capable of recognizing the "address expansion" protocol. It cannot be assumed, however, that every packet switching network is capable of recognizing and interfacing with the "address expansion" protocol. Thus, there is the need in the art for a method of creating virtual connections in packet switching networks without the requirement that the second packet switching network be capable of interfacing with a particular protocol.

SUMMARY OF THE INVENTION

In the present invention, a virtual connection is completely set up upon initiation of the signaling procedure employed by this packet switching network which defines an alternate route within the second packet switching network. Only an existing connection and signaling packets are required to transparently transmit via the alternate route between calling subscriber equipment and called subscriber equipment of the first packet switching network. Thus, no specific demands are made of the signaling procedure within the second packet switching network and any arbitrary signaling procedure can be employed by this packet switching network.

DESCRIPTION OF THE PREFERRED EMBODIMENTS

Figure 1:
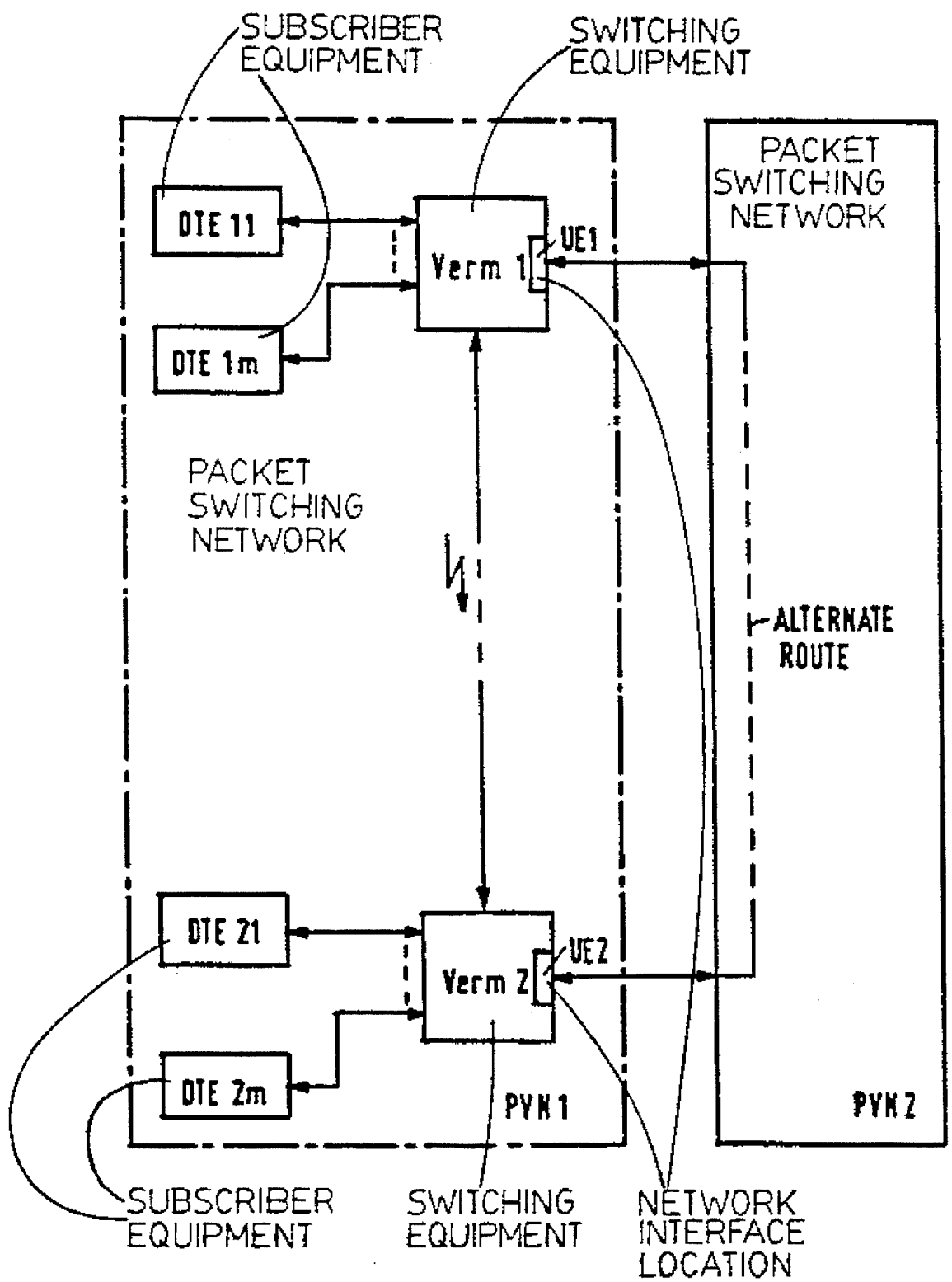
FIG. 1 illustrates a block diagram of a communications system which incorporates the present invention.

FIG. 1 shows two separate packet switching networks PVN1 and PVN2 that are connected to one another via network interface locations UE1 and UE2. In the example of the preferred embodiment, the packet switching network PVN1 is a private packet switching network and the packet switching network PVN2 is a public packet switching network. First switching equipment V1 and second switching equipment V2 are connected to a respective plurality of subscriber stations within packet switching network PVN1. In accordance with their affiliation to the switching equipment, the subscriber equipment is thereby referenced DTE11 through DTE1m and DTE21 through DTE2m, respectively. Transmission of signaling packets for setting up virtual connections and data packets across existing virtual connections ensues between the subscriber equipment and the corresponding switching equipment in accordance with CCITT Recommendation X.25. Signaling packets and data packets are also exchanged between the two packet switching networks PVN1 and PVN2 according to this CCITT Recommendation over the two afore-mentioned network interface locations UE1 and UE2.

Switching equipment V1 and V2, which are capable of carrying out both originating as well as destination switching functions, are in communication with one another via one or more trunk lines, whereby these trunk lines can be potentially implemented via transit switching centers. The transmission of signaling and data packets between the switching equipment thereby ensues according to a trunk protocol based on CCITT Recommendation X.25.

Having set forth the fundamental structure of the packet switching network PVN1 and the coupling thereof to the packet switching network PVN2 of the present invention, the method of the invention shall now be discussed in greater detail by way of the following example.

In this example, it is assumed that a virtual connection is to be set up between the subscriber equipment DTE 11 and the subscriber equipment DTE21 by only using the switching equipment V1 and V2. For this call set up, a call packet ("call request") is transmitted from the calling subscriber equipment DTE11 to the switching equipment V1 according to CCITT Recommendation X.25. Address information which identifies the subscriber equipment DTE21 as the calling subscriber equipment is contained in an address field of this call request. A route search for a suitable connecting path within the packet switching network PVN1 for forming a virtual connection then ensues proceeding from the switching equipment V1 based on this address information. When this connecting path is defined, then further call set up ensues by exchanging declared signaling packets between the switching equipment V1 and V2 and the subscriber equipment DTE11 and DTE21 which are connected via the virtual connection.

When, during this initial route search, no suitable connecting path can be defined within the packet switching network PVN1 to the called subscriber equipment DTE21, then, as set forth below, an alternate route is selected which employs packet switching network PVN2. This may only occur, for example, as a result of an interruption of the trunk line or trunk lines provided between the switching equipment V1 and V2. In order to select such an alternate route, the call request received by the switching equipment V1 is transmitted to the network interface location UE1 and is temporarily stored at this location. In response to this call request, the network interface location UE1 or switching equipment initiates the setup of a separate, virtual connection within the second packet switching network PVN2 to the network interface location UE2. This is done in accordance with the signaling procedure employed by the second packet switching network PVN2. In order to accomplish this, a separate call request is first transmitted to the packet switching equipment of the packet switching network PVN2, which is connected to the network interface location UE1. Address information identifying the network interface location UE2 is contained in the address field of this separate call request, and this address information is deposited in the database of the switching equipment V1. A route search for a suitable connecting path to the network interface location UE2 then ensues in the switching equipment of the packet switching network PVN2 based on the address information contained in the address field. A virtual connection within the packet switching network PVN2 between the network interface locations UE1 and UE2, i.e., between the switching equipment V1 and V2 is, thus, set up completely in accordance with the signaling procedure provided for the packet switching network PVN2 after such a connecting path is defined. The call request initially retained in the switching equipment V1, i.e., at the network interface location, is subsequently inserted as useful information into a data packet which is transmitted through the packet switching network PVN2 to the switching equipment V2 of the packet switching network PVN1 via the virtual connection which has just been set up. This call request is thus transparently transmitted within the packet switching network PVN2. If the length of a data packet is not of sufficient size for a complete transmission of the call request, the call request is segmented. Individual segments are then transparently transmitted within the packet switching network PVN2 in a plurality of data packets via this virtual connection.

After a depacketing of the data packet by the switching equipment V2, the switching equipment V2 transmits a signaling packet generated according to CCITT Recommendation X.25 which indicates an incoming call to the subscriber equipment DTE21. This is based on the address information contained in the transmitted call request which identifies the called subscriber equipment DTE21. In response to the reception of this signaling packet, the called subscriber equipment DTE21 generates a call accepted packet which is supplied to the calling subscriber equipment DTE11 via the previously defined alternate route proceeding through the packet switching network PVN2. The transmission of the call accept packet thereby ensues transparently in one or more data packets via the virtual connection established within the packet switching network PVN2. The set up of a virtual connection between the subscriber equipment DTE11 and DTE21 is thereby accomplished. Transmission of data packets between these subscriber equipment across the virtual network then begins. The data packets appearing in the packet switching network PVN1 are also inserted into data packets of the alternate route for transmission within the packet switching network PVN2 and are thus transparently transmitted within the packet switching network PVN2. The original data packets may also be likewise segmented as previously noted.

Similar control events occur for all other virtual connections which are to be set up between subscriber equipment of the packet switching network PVN1 in the event that an alternate route via the packet switching network PVN2 is required for these virtual connections.

It may also arise in the above-explained example that information about requested network-specific performance features of the packet switching network PVN1 are contained within a service field of a call request supplied to the switching equipment V1 as provided according to CCITT Recommendation X.25. This is to be transmitted to the switching equipment V2 serving as destination switching equipment in the assumed example or, subsequently, to the called subscriber equipment DTE21. This service information is transparently transmitted within the packet switching network PVN2 together with the call request, and there is no evaluation of the service information contained in the call request. An evaluation only ensues in the switching equipment V2 of the packet switching network PVN1 or, alternatively, in the subscriber equipment DTE21.

It is assumed above that the network interface locations UE1 and UE2 are provided in the originating and destination switching equipment V1 and V2. Additionally or alternatively, these network interface locations, however, can also be established in transit switching equipment of the packet switching network PVN1. In this case, a call request arriving in the switching equipment V1 in the assumed example is forwarded to a transit switching center which may be used for the requested virtual connection. When the latter determines that an alternative route is to be set up via the packet switching network PVN2, then the existing call request is first retained at the network interface location and a virtual connection is set up in the above-recited way to a network interface location provided for reentry into the packet switching network PVN2. Address information relating to this network interface location, which may exist in a further transit switching equipment or in a destination switching equipment (V2), is stored in the database of the corresponding transit switching equipment.

The above-described method for setting up virtual connections is designed so that when a virtual connection is initially conducted via an alternate route through the packet switching network PVN2, the call may be forwarded to an internal connecting path when a connecting path within the packet switching network PVN1 becomes available. Information identifying the existence of an alternate route virtual connection is separately maintained in the switching equipment of the packet switching network PVN1. In the above-explained example, this information is maintained, for example, in the switching equipment V1 or, alternatively, the transit switching equipment connected to the network interface location UE1. When information in this switching equipment indicates that the previously unavailable connection within the packet switching network PVN1 is again operational, the above-described virtual connection between originating and destination switching equipment of the packet switching network PVN1, i.e., the connection between the switching equipment V1 and V2 in this case, that was previously conducted via the alternate route of the packet switching network PVN2 is eliminated. The virtual subconnections existing between these switching equipment and the subscriber equipment participating in the virtual connection, i.e., the subscriber equipment DTE11 and DTE21 in this case, are not affected by this action. Subsequently, a connecting path within the packet switching network PVN1 to the switching equipment connected to the called subscriber equipment, the switching equipment V2 in this case, is defined during the course of a renewed route search based on the address information still stored in the switching equipment V1 for the called subscriber equipment DTE21 and a corresponding call request is transmitted via this connecting path.

This call request thereby contains a service signal with which the switching equipment V2 is told that a virtual connection already conducted via an alternate route is to be reestablished, i.e., that this call request is not to be transmitted to the called subscriber equipment. In response to the reception of this call request, an exchange of signaling packets ensues within the packet switching network PVN1 between the switching equipment V1 and V2 in order to again completely set up the previously briefly interrupted virtual connection between the subscriber equipment DTE11 and DTE21.

All of the data packets output from the switching equipment V1 may not be received by the switching equipment V2 as a result of the reestablishment of a virtual sub-connection within the packet switching network PVN1 and the brief partial interruption of the previous connection. In order to prevent any loss of data, a transmission counter is located in the switching equipment V1 for the virtual connection which includes a momentary counter reading that deviates from the corresponding reception counter kept in the switching equipment V2 if all of the transmitted data packets are not received. This momentary counter reading, as known, corresponds to the sequential number of the data packet most recently sent or, alternatively, received during the course of the virtual connection. A matching of these momentary counter readings is achieved in the present exemplary embodiment by transmitting information relating to the counter reading of the reception counter which is kept in the switching equipment V2 to the switching equipment V1 in a call accepted packet that concludes the setup of the sub-connection. This may be located in a user data field of this call accepted packet.

The switching equipment V1 then continues the transmission of data packets with that data packet whose sequence number corresponds to the counter reading which has just been communicated. When, as a result of the above-explained, brief-duration partial interruption of the existing virtual connection, all data packets sent by the switching equipment V1 have not arrived in the switching equipment V2, the data packets that have been lost and which are still retained in memory at switching equipment V1 are retransmitted to the switching equipment V2.

Up to now, we have only considered the example wherein data packets are transmitted from calling subscriber equipment to called subscriber equipment with an established virtual connection. Given a bidirectional virtual connection, as is the case with a connection according to CCITT Recommendation X.25, the data packets transmitted in the opposite direction are also transparently transmitted in the above-recited way in data packets of the alternate connection within the packet switching network PVN2. Additionally, a transmission counter is kept in the above-explained exemplary embodiment in the switching equipment V2 for this opposite direction and, by contrast, a corresponding reception counter is kept in the switching equipment V1. Upon reestablishment of a virtual connection exclusively within the packet switching network PVN1 initially conducted via an alternate route, information relating to the momentary counter reading of the reception counter are transmitted to the switching equipment V2 in the aforementioned call request. This may be contained, for example, in the user data field. This is done in order to achieve resynchronization of the transmission and reception counters on the basis of this information.

Let it also be pointed out in conclusion that the alternate set up of a virtual connection employing a public packet switching network PVN2 upon observation of the CCITT Recommendation X.25 and of the afore-mentioned trunk protocol has in fact been set forth above with reference to the example of such a virtual connection between the subscriber equipment DTE11 and DTE21, which are within a private packet switching network PVN1. The above-described method, however, can be applied when a suitable connecting path for a virtual connection is temporarily unavailable within a packet switching network generally. For example, when there is outage of trunk lines, all that is necessary is that the packet switching network be in communication with a further packet switching network via interface locations. Signaling procedures that deviate from said CCITT Recommendation and from the trunk protocol can thereby also be employed in the two packet switching networks.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method for setting up virtual connections between a calling subscriber equipment and a called subscriber equipment, wherein the calling subscriber equipment is connected to a first switching equipment of a first packet switching network and the called subscriber equipment is connected to a second switching equipment of the first packet switching network, a first network interface location connects the first switching equipment of the first packet switching network to a second packet switching network and a second network interface location connects the second packet switching network to the second switching equipment of the first packet switching network, said method comprising the steps of:

transmitting a first call request from the calling subscriber equipment to the first switching equipment of the first packet switching network requesting connection with the called subscriber equipment;

storing address information identifying the second network interface location in a data base associated with the first switching equipment;

performing a search for a connection path between the first switching equipment of the first packet switching network and second switching equipment of the first packet switching network within the first packet switching network;

determining that a result of the search for a connection path between the first and second switching equipment of the first packet switching network within the first packet switching network is negative;

automatically recalling the stored address information identifying the second network interface location and transmitting a second call request from the first network interface location to a first switching equipment of the second packet switching network in response to a negative result of the step of determining a result of the search for a connection path, the second call request containing the address information identifying the second network interface location;

performing a search for a connection path within the second packet switching network, from the first switching equipment of the second packet switching network to the second network interface location; and creating a virtual connection between the first and second network interface locations within the second packet switching network.

2. The method of claim 1, wherein at least one of the first and second network interface locations is transit switching equipment.

3. The method of claim 1, further comprising the step of transmitting data packets from the calling subscriber network to the called subscriber network via the virtual connection between the first and second network interface locations within the second packet switching network.

4. The method of claim 3, wherein the transmitted data packets are segmented data packets.

5. The method of claim 1, further comprising the additional steps of:

determining when a connection path within the first packet switching network from the first switching equipment of the first packet switching network to the second switching equipment of the first packet switching network becomes available; and creating a virtual connection within the first packet switching network from the first switching equipment of the first packet switching network to the second switching equipment of the first packet switching network.

6. The method of claim 1, comprising the additional step of:

comparing a transmission counter reading associated with the first switching equipment of the first packet switching network with a reception counter reading associated with the second switching equipment of the first packet switching network.

7. The method of claim 1, wherein the first packet switching network is a private packet switching network.

8. The method of claim 1, wherein the second packet switching network is a public packet switching network.

9. A method for setting up a virtual connection between a calling subscriber equipment and a called subscriber equipment of a first packet switching network wherein the calling subscriber equipment is connected to a first switching equipment of a first packet switching network and the called subscriber equipment is connected to a second switching equipment of the first packet switching network, a first network interface location connects the first switching equipment of the first packet switching network to a second packet switching network and a second network interface location connects the second packet switching network to the second switching equipment of the first packet switching network, said method comprising the steps of:

transmitting a first call request from the calling subscriber equipment to the first switching equipment of the first packet switching network requesting connection with the called subscriber equipment;

performing a search for a connection path between the first switching equipment of the first packet switching network and second switching equipment of the first packet switching network within the first packet switching network;

determining that a result of the search for a connection path between the first and second switching equipment of the first packet switching network within the first packet switching network is negative;

retaining the first call request at the first network interface location and transmitting a second call request from the first network interface location to a first switching equipment of the second packet switching network, the second call request containing address information identifying the second network interface;

automatically performing a search for a connection path within the second packet switching network from said first network interface location to said second network interface location in response to a negative result of the step of determining a result of the search for a connection path;

setting up a virtual connection between the first and second network interface locations within the second packet switching network; and transmitting the retained first call request via the virtual connection within the second packet switching network from the first network interface location to the second network interface location.

10. The method of claim 9, wherein at least one of the first and second network interface locations comprises transit switching equipment.

11. The method of claim 9, further comprising the step of transmitting data packets from the calling subscriber equipment to the called subscriber equipment via the virtual connection between the first and second network interface locations within the second packet switching network.

12. The method of claim 11, wherein the transmitted data packets are segmented data packets.

13. The method of claim 9, further comprising the additional steps of:

determining when a connection path from the first switching equipment of the first packet switching network to the second switching equipment of the first packet switching network within the first packet switching network becomes available; and creating a virtual connection within the first packet switching network from the first switching equipment of the first packet switching network to the second switching equipment of the first packet switching network.

14. The method of claim 9, comprising the additional step of:

comparing a transmission counter reading associated with the first switching equipment of the first packet switching network with a reception counter reading associated with the second switching equipment of the first packet switching network.

15. The method of claim 9, wherein the first packet switching network is a private packet switching network.

16. The method of claim 9, wherein the second packet switching network is a public packet switching network.

* * * * *